United States Patent
Mita et al.

[19]

[11] Patent Number: 6,052,259
[45] Date of Patent: Apr. 18, 2000

[54] HEAD SUPPORT ARM HAVING CONDUCTIVE WIRES OF A DISK DRIVE DEVICE

[75] Inventors: Yasuhiro Mita, Fujisawa; Tatsushi Yoshida, Chigasaki; Hiromi Ishikawa, Fujisawa; Tatsuya Tanaka, Chigasaki; Hiroyasu Tsuchida, Yokohama; Takuya Satoh, Hayama-machi, all of Japan

[73] Assignee: International Business Machines Corporation, Armonk, N.Y.

[21] Appl. No.: 09/098,687

[22] Filed: Jun. 17, 1998

[30] Foreign Application Priority Data

Jul. 24, 1997 [JP] Japan .................................. 9-198117

[51] Int. Cl.$^7$ ...................................................... G11B 5/48
[52] U.S. Cl. ............................................................ 360/104
[58] Field of Search .............................................. 360/104

[56] References Cited

U.S. PATENT DOCUMENTS

| | | | |
|---|---|---|---|
| 5,623,758 | 4/1997 | Brooks, Jr. et al. ................. | 29/603.01 |
| 5,812,349 | 9/1998 | Shouji et al. ........................... | 360/110 |
| 5,859,746 | 1/1999 | Ishida et al. ......................... | 360/97.01 |
| 5,864,445 | 1/1999 | Bennin et al. ......................... | 360/104 |
| 5,930,078 | 1/1999 | Albrecht et al. ....................... | 360/104 |
| 5,936,802 | 8/1999 | Koizumi et al. ....................... | 360/104 |

*Primary Examiner*—Jefferson Evans
*Attorney, Agent, or Firm*—Douglas R. Millett

[57] ABSTRACT

A head support arm of a disk drive device comprises; a front portion supporting a head/slider assembly, a rear portion pivotally mounted on a frame of the disk drive device, a bending portion between the front portion and the rear portion, a plurality of electrically conductive wires covered by a tube, and a first fixing position and a second fixing position symmetrically located on both sides of a center line of the head support arm at positions between the bending portion and the front portion, characterized in that the tube is attached to the head support arm between the bending portion and the rear portion, the plurality of electrically conductive wires extending from a front end of the tube on the side of the front portion of the head support arm extend over the bending portion and are divided into a first group and a second group, the first group of wires is fixed to the second fixing position.

12 Claims, 8 Drawing Sheets

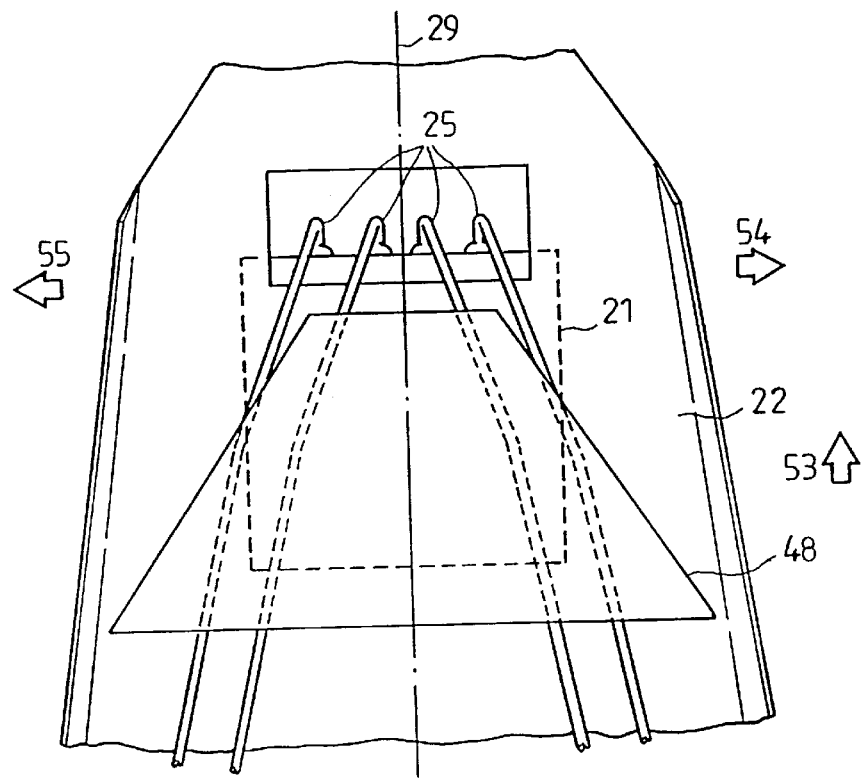
FIG. 9
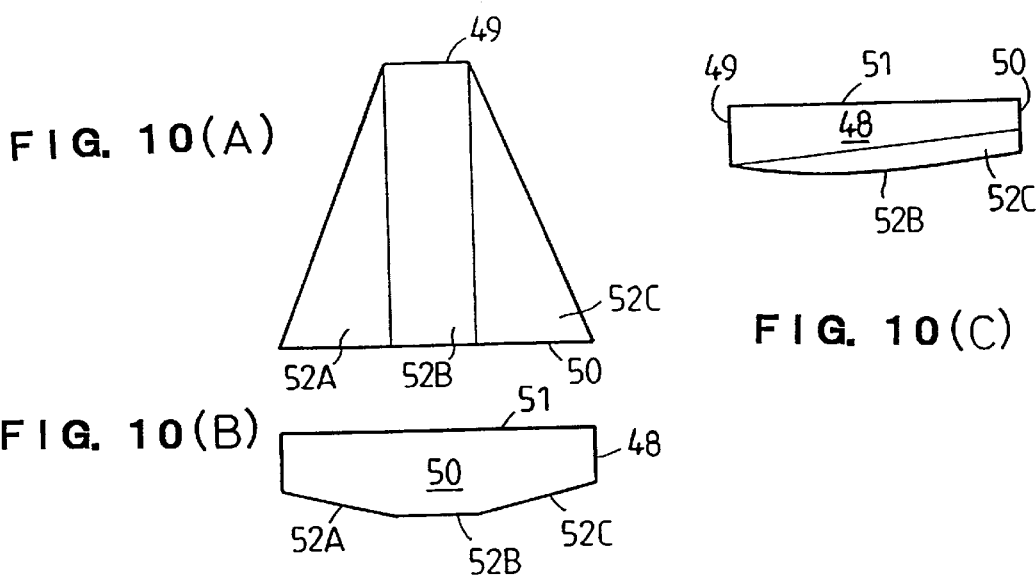
FIG. 10(A)
FIG. 10(B)
FIG. 10(C)

HEAD SUPPORT ARM HAVING CONDUCTIVE WIRES OF A DISK DRIVE DEVICE

FIELD OF THE INVENTION

The present invention relates to a head support arm, a disk drive device and a method for fabricating the head support arm.

BACKGROUND OF THE INVENTION

It has been a requirement in the technical field of hard disk drive devices to increase the data capacity, the read/write speed and the recording density. A key for realizing high data capacity is to keep a low flying height of a head/slider assembly above a recording disk. It is a requirement to precisely control static attitude of the head/slider assembly above the recording disk to realize the low flying height of the head/slider assembly. The static attitude refers to the attitude of the head/slider assembly attached to the flexure.

A magneto resistance (MR) head with four connecting wires has been used as a read/write head of the hard disk drive device. The stiffness of the four connecting wires affects the static attitude of the head/slider assembly.

FIGS. 1 and 2 show a prior art support arm which uses a relatively large head/slider assembly called as 50% type slider or nano type slider, which has dimensions of 1.6 mm (width)×2.0 mm (length). The prior support arm contains an actuator arm 4 which has a pivot point 10 mounted on a frame of the hard disk drive device, a load beam 2, a mount plate 3 connecting the load beam 2 with the actuator arm 4, a flexure 7 attached to the load beam 2 at coupling points 8, and a head/slider assembly 1 mounted on the flexure 7. The head/slider assembly 1, the flexure 7, the load beam 2 and the mount plate 3 are referred to collectively as a head gimbal assembly (HGA).

A flexible tube 6 containing the four connecting wires 5 connected to the MR head 12 is mounted on one side edge of the support arm. It is noted that the tube 6 is fixed to the side edge at plural positions by fixing elements 14. A front end of the tube 6 is located near to the head/slider assembly 1, and the four connecting wires 5 extending from the front end are connected to the MR head 12, as shown in the FIGS. 1 and 2.

A dimple or extruded portion 13 attached to the load beam 2 engages with the flexure 7 supporting the head/slider assembly 1 to realize a gimbal type movement of the head/slider assembly 1. The prior art head support arm has the following two problems. The first problem is that the tube 6 containing the four connecting wires 5 is mounted at one of side edges and is positioned across the bending portion 11, so that the total stiffness of the tube 6 and the four connecting wires 5 applies a force to one of the side edges, i.e. an upper edge, and this force prevents the bending action of the upper side edge, whereby the bending action of the upper side edge mounted with the tube 6 and the four connecting wires 5 differ from the bending action of the lower side edge, thereby the load beam 2 tends to twist when the support arm is bent. This twist affects the static attitude of the head/slider assembly.

The second problem is caused by different stiffness of the four wires 5 connected to the MR head 12. If the bias force applied by each of the four connecting wires 5 to the MR head 12 is equal to each other, the head/slider assembly 1 can perform an ideal gimbal type movement in a rolling direction and a pitching direction on the dimple 13. The four connecting wires 5, however, extend from the front end of the tube 6 fixed on the upper side of the load beam 2, and hence the length of each of the four connecting wires 5 differ from each other and an angle of each of the four connecting wires 5 to the MR head 12 differ from each other, so that the stiffness of each of the four connecting wires 5 differ from each other, whereby the difference in the stiffness of each of the wires 5 remarkably affects the static attitude of the head/slider assembly 1 in the rolling direction.

For the reason described above, it is difficult to provide the ideal static attitude of the head/slider assembly 1, whereby it is difficult to precisely control the flying height of the 50% type head/slider assembly 1.

A recently developed head/slider assembly called as 30% type slider or pico type slider has smaller dimensions of 1.0 mm (width)×1.25 mm (length)×0.43 (height). The above described wiring scheme can not be used in the 30% type head/slider assembly, since the smaller head/slider assembly is more sensitive to the stiffness of the wiring system.

SUMMARY OF THE INVENTION

It is an object of the present invention to provide a wiring scheme for both the 50% type head/slider assembly and 30% type head/slider assembly.

A head support arm of a disk drive device in accordance with the present invention comprises;
 a front portion supporting a head/slider assembly,
 a rear portion pivotally mounted on a frame of the disk drive device,
 a bending portion between the front portion and the rear portion, plural electrically conductive wires covered by a tube, and
 a first fixing position and a second fixing position symmetrically located on both sides of a center line of the head support arm at positions between the bending portion and the front portion, and is characterized in that the tube is attached to the head support arm between the bending portion and the rear portion, the plural electrically conductive wires extending from a front end of the tube on the side of the front portion of the head support arm extend over the bending portion and are divided into a first group and a second group, the first group of wires is fixed at the first fixing position, the second group of wires is fixed at the second fixing position, the first group of wires extending from the first fixing position is connected to the head, the second group of wires extending from the second fixing position is connected to the head, the first group of wires extending from the first fixing position to the head and the second group of wires extending from the second fixing position to the head are symmetrically arranged on both sides of the center line.

The tube is attached to one of side edges of the head support arm.

A third fixing position is located on the head support arm between the bending portion and the rear portion, and the plural electrically conductive wires extending from the front end of the tube are fixed at the third fixing position.

The bending portion is defined by an aperture formed in the head support arm between the front portion and the rear portion, and the plural electrically conductive wires extending from the third fixing point extend to a center position within the aperture, the position is located on the center line, and the plural electrically conductive wires are divided into the first group and the second group at the center position.

A distance from the third fixing position to the first fixing position is shorter than a total length of the wires which extend from the third fixing position to the center position and extend from the center position to the first fixing position, and a distance from the third fixing position to the second fixing position is shorter than a total distance of the wires which extend from the third fixing position to the center position and extend from the center position to the second fixing position.

A disk drive device in accordance with the present invention comprises;
- a recording disk,
- a drive motor for rotating the recording disk,
- a head support arm supporting a head/slider assembly, and
- a means for moving the head support arm to move the head/slider assembly in a radial direction of the recording disk, the head support arm contains;
- a front portion supporting the head/slider assembly,
- a rear portion pivotally mounted on a frame of the disk drive device,
- a bending portion between the front portion and the rear portion, plural electrically conductive wires covered by a tube, and
- a first fixing position and a second fixing position symmetrically located on both sides of a center line of the head support arm at positions between the bending portion and the front portion, and is characterized in that the tube is attached to the head support arm between the bending portion and the rear portion, the plurality of electrically conductive wires extending from a front end of the tube on the side of the front portion of the head support arm extend over the bending portion and are divided into a first group and a second group, the first group of wires is fixed at the first fixing position, the second group of wires is fixed at the second fixing position, the first group of wires extending from the first fixing position is connected to the head, the second group of wires extending from the second fixing position is connected to the head, the first group of wires extending from the first fixing position to the head and the second group of wires extending from the second fixing position to the head are symmetrically arranged on both sides of the center line.

A method in accordance with the present invention for fabricating a head support arm of a disk drive device which contains a front portion supporting a head/slider assembly, a rear portion pivotally mounted on a frame of the disk drive device, and a bending portion between the front portion and the rear portion, with a first fixing position and a second fixing position symmetrically located on both sides of a center line of the head support arm at positions between the bending portion and the front portion, comprises the steps of;
- attaching a tube within which a plurality of electrically conductive wires are contained to one of the side edges of the head support arm at positions between the bending portion and the rear portion,
- dividing the plurality of electrically conductive wires extending from a front end of the tube on the side of the front end into a first group and a second group at a position above the bending portion,
- connecting the first group of wires to the first fixing position and the second group of wires to the second fixing position, and
- connecting the first group of wires extending from the first fixing position to the head, and the second group of wires extending from the second fixing position to the head, with the first group of wires extending between the first fixing position and the head and the second group of wires extending between the second fixing position and the head being symmetrically arranged on both sides of the center line.

The method further comprises a step for moving the first group of wires extending from the first fixing position to the head in a direction from the center line to one of the side edges and moving the second group of wires extending from the second fixing position to the head in a direction from the center line to the other of the side edges.

For a fuller understanding of the present invention, reference should be made to the following detailed description taken in conjunction with the accompanying drawings.

BRIEF DESCRIPTION OF THE DRAWINGS

FIG. 9 shows a step of the method of the present invention.

FIGS. 10(A) to 10(C) shows the structure of the shaping element used in the present invention.

DESCRIPTION OF THE PREFERRED EMBODIMENT

Figure 1:
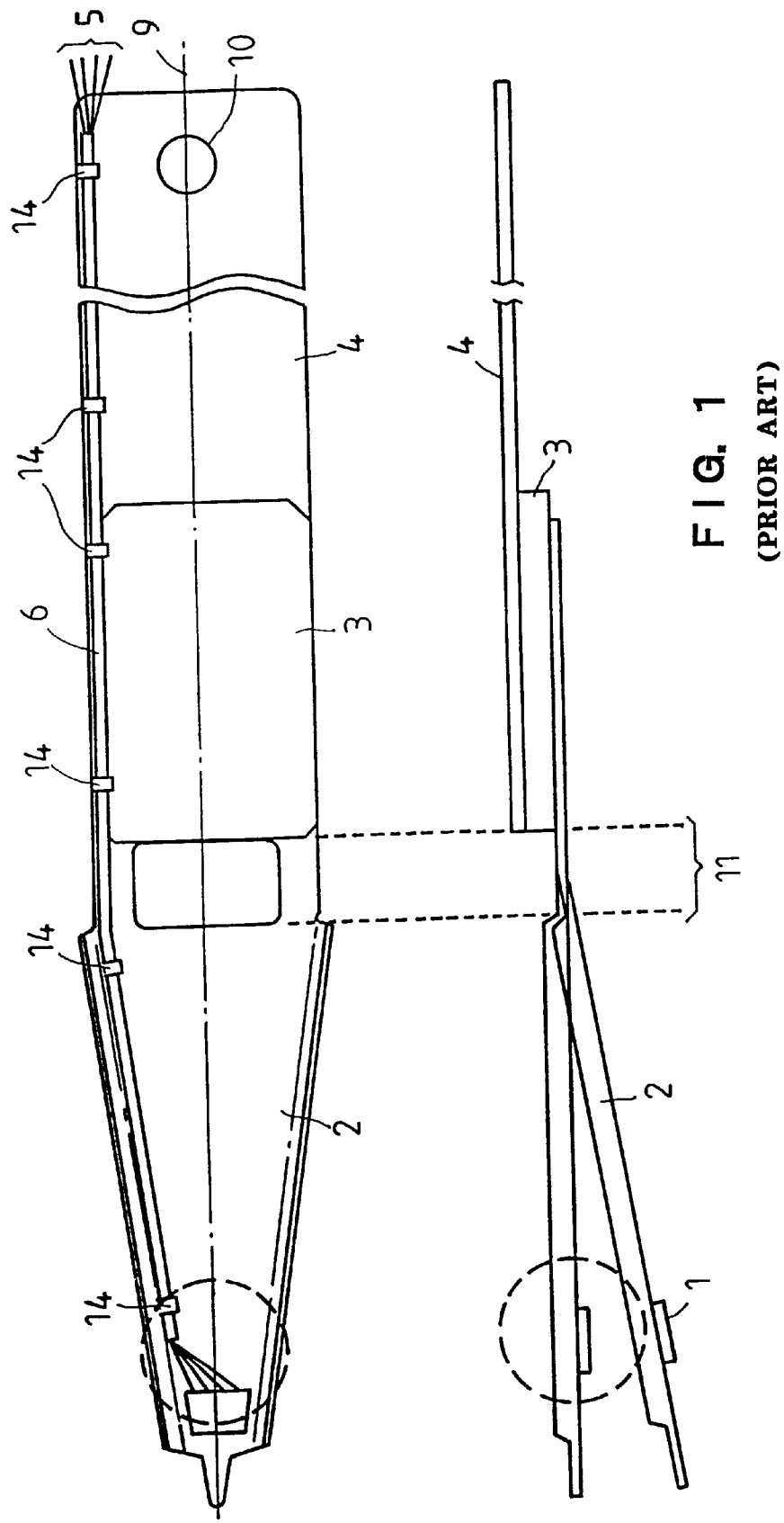
FIG. 1 shows the prior art head support arm.
Figure 2A:
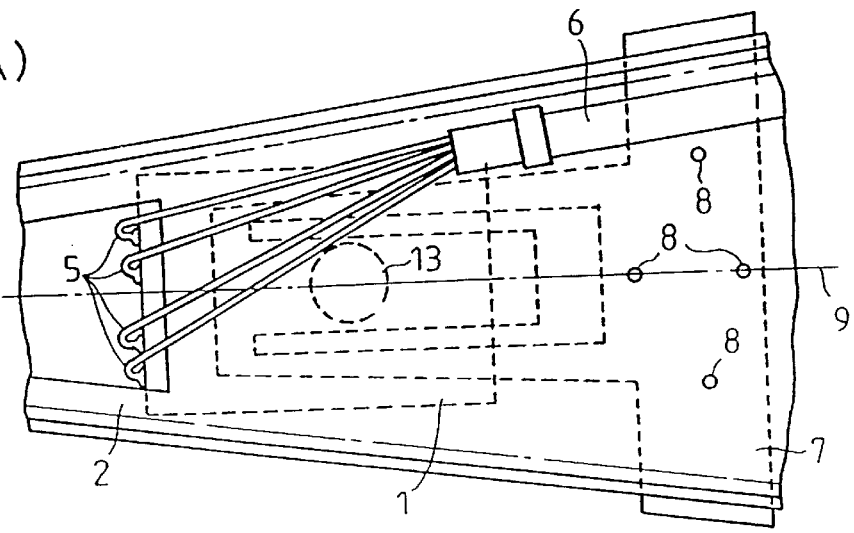
FIGS. 2A and 2B show a top and side view, respectively, of the wiring scheme of the prior art head support arm.
Figure 2B:
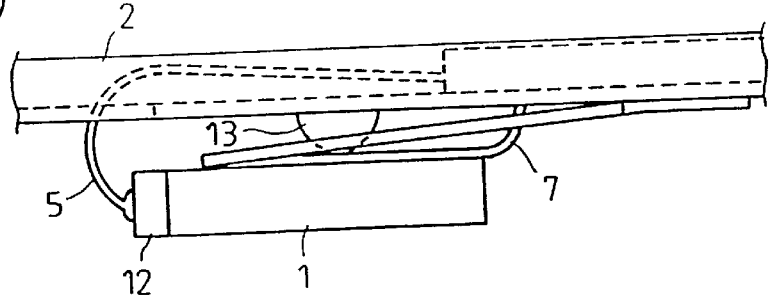
Figure 3:
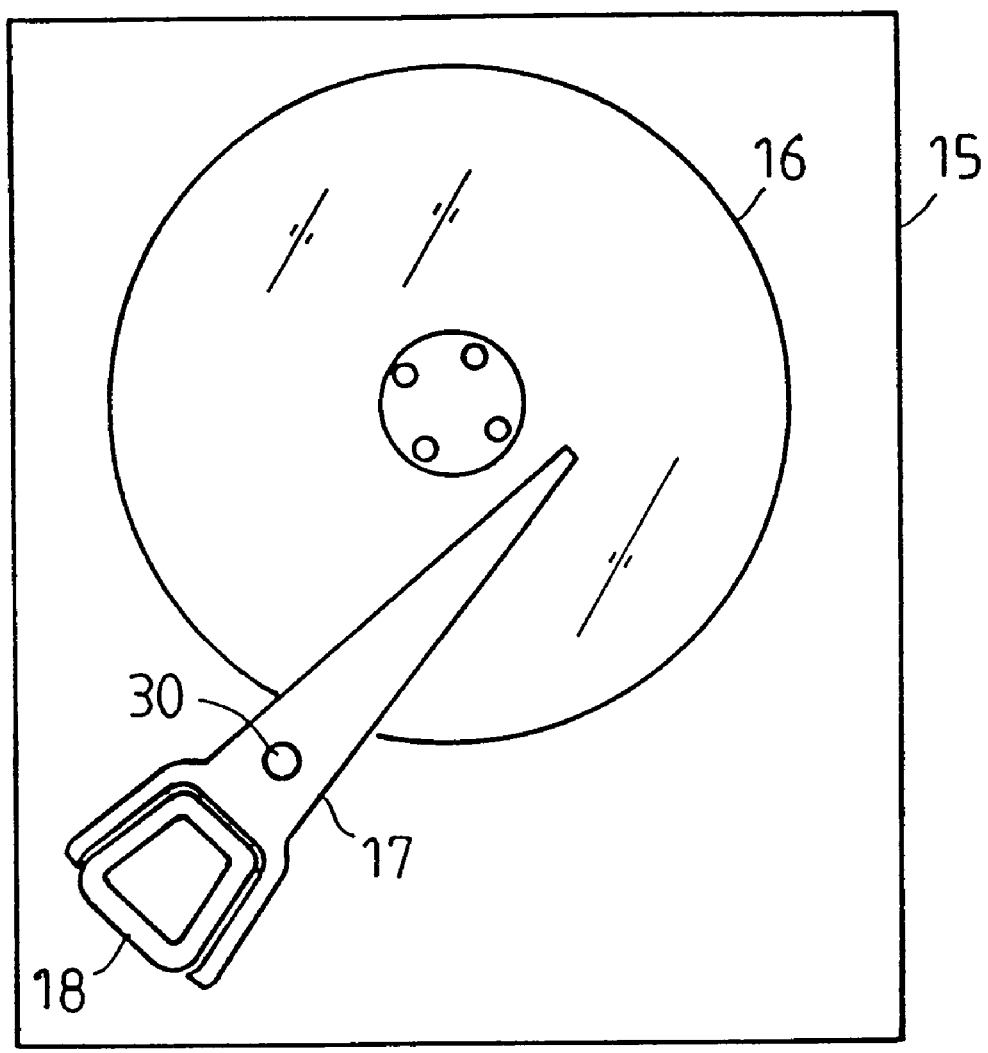
FIG. 3 shows the hard disk drive device using the head support arm of the present invention.

FIG.3 shows a hard disk drive device 15 which contains a magnetic recording disk or a rotating recording disk 16 and a head support arm 17. The magnetic recording disk 16 is rotated by a spindle motor, not shown, and the head support arm 17 is pivotally mounted on a frame of the hard disk drive device 15 at a pivot point 30. The head support arm 17 is moved by a voice coil motor 18 in a radial direction of the magnetic recording disk 16. A control circuit for controlling the spindle motor and the voice coil motor 16, a read/write circuit for controlling a read/write operation of data and a main control circuit for controlling the control circuit and the read/write circuit are contained within the hard disk drive device 15. These circuits are well known in the art, and are not shown in order to simplify the drawing.

Figure 4:
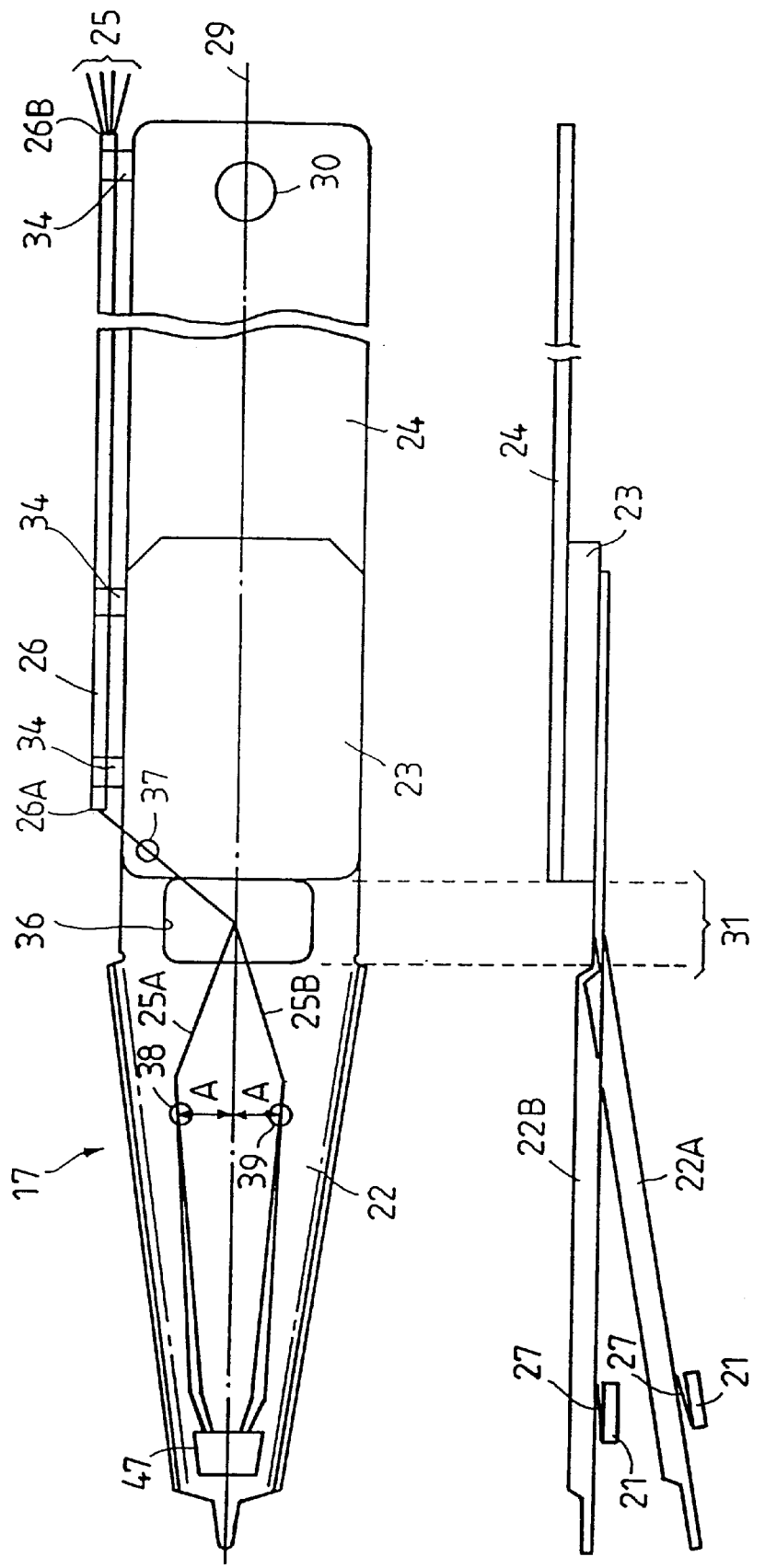
FIG. 4 shows the first embodiment of the head support arm of the present invention.

FIG.4 shows a first embodiment of the head support arm 17, in accordance with the present invention, which contains an actuator arm 24 which has a pivot point 30 mounted on the frame of the hard disk drive device 15, a load beam 22, a mount plate 23 connecting the load beam 22 with the actuator arm 24, a flexure 27 (FIGS. 7 and 8) attached to the load beam 22 at coupling points 28, and a head/slider assembly 21 mounted on the flexure 27. In this manner, a front portion of the support arm 17 supports the head/slider assembly 21, and a rear portion of the support arm 17 is pivotally mounted on the frame of the hard disk drive device 15. The head/slider assembly 21, the flexure 27, the load beam 27 and the mount plate 23 are called a head gimbal assembly (HGA). The detail of the flexure 27 is shown in FIGS. 7 and 8.

Figure 7:
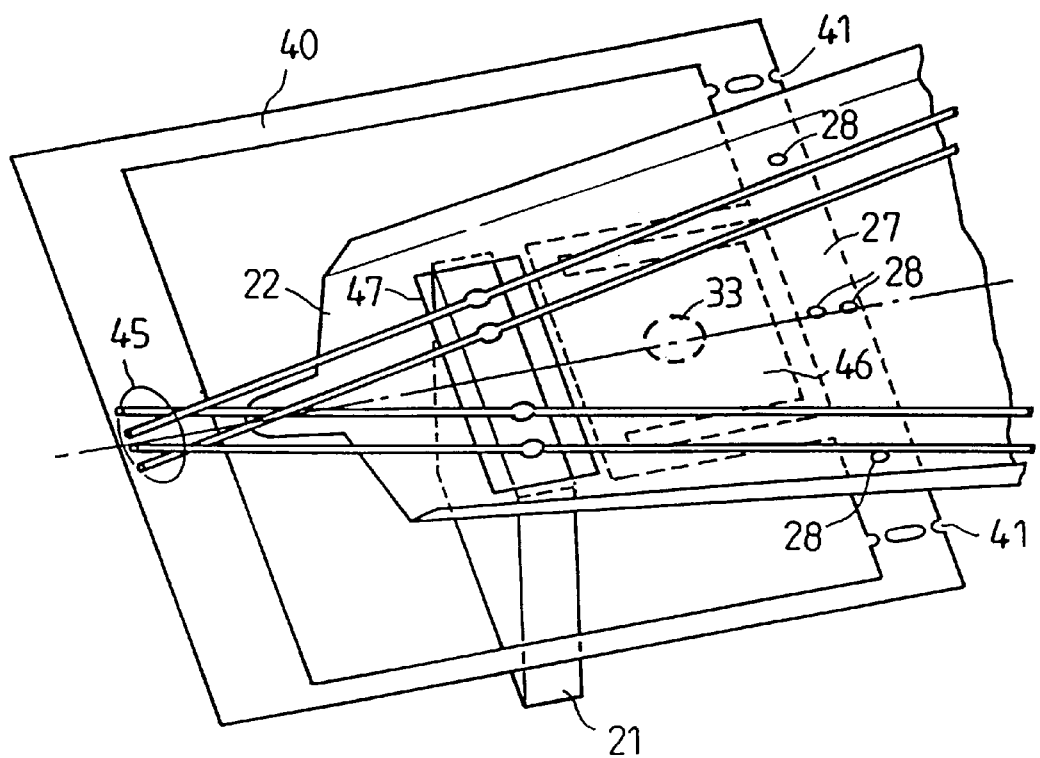
FIG. 7 shows a step of the method of the present invention.
Figure 8:
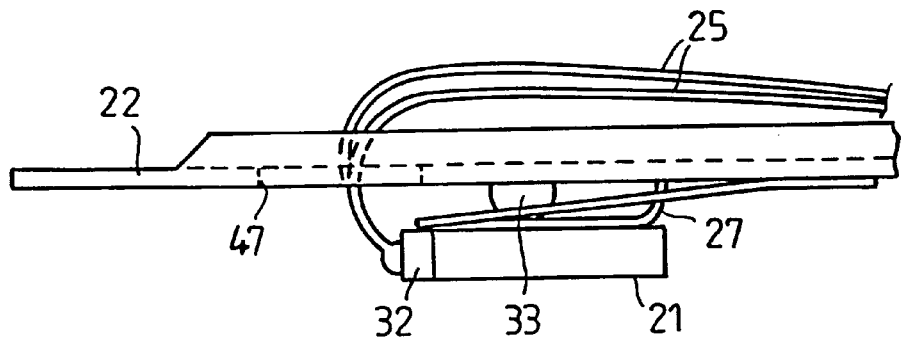
FIG. 8 shows a step of the method of the present invention.

As shown in FIGS. 7 and 8, the MR read/write head 32 has four connecting terminals, and the four electrically conductive connecting wires 25, called as connecting wires 25 hereinafter, are connected to the four terminals, respectively. The four connecting wires 25 are covered by a flexible tube 26. The tube 26 is attached to the support arm 17 by fixing elements 34 at positions between the bending portion 31 and the rear portion of the support arm 17. More particularly, the tube 26 is attached to one of side edges of the mount plate 23 and the actuator arm 24 by the fixing elements 34.

A dimple or extruded portion 33 attached to the load beam 22 engages with the flexure 27 supporting the head/slider assembly 21 to realize a gimbal type movement of the head/slider assembly 21.

An aperture 36 is formed in the load beam 22 to define a bending portion 31 of the load beam 22. The load beam 22 is bent at the bending portion 31, as shown by the bent load arm 22A, and is bent to a position shown by the load beam 22B by an air bearing produced between a lower surface of the head/slider assembly 21 and a recording surface of the magnetic recording disk 16 when the disk 16 is rotated by the spindle motor.

A first fixing position 38 and a second fixing position 39 are symmetrically located on both sides of a center line 29 of the support arm 17 at positions between the bending portion 31 and the front portion of the head support arm 17. A distance from the first fixing position 38 to the center line 29 is equal to a distance from the second fixing position 39 to the center line 28, and the distance is represented by a distance A.

The four connecting wires 25 extending from the front end 26A of the tube 26 on the side of the front portion of the support arm 17 extend over the bending portion 31 and are divided into a first group 25A, i.e. two wires, and a second group 25B, i.e. two wires. In the first embodiment, the front end 26A of the tube 26 is located between the bending portion 31 and the rear portion of the support arm 17 at which the pivot point 30 is provided. The four wires 25 extending from the front end 26A are fixed on the mount plate 23 at a third fixing position 37 by a proper adhesive material. The four wires 25 are divided into the first group of wires 25A and the second group of wires 25B at a position above the center line 29 of the support arm 17 to equalize a biasing force of the first group of wires 25A applied to the load beam 22 to a biasing force of the second group of wires 25B applied to the load beam 22. The four connecting wires 25 extending from a rear end 26B of the tube 26 are connected to the read/write circuit.

The first group of wires 25A is fixed to the load beam 22 at the first fixing position 38 by the adhesive material, and the second group of wires 25B is fixed to the load beam 22 at the second fixing position 39 by the adhesive material. The first group of wires 25A extending from the first fixing position 38 is connected to the MR head 32, and the second group of wires 25B extending from the second fixing position 39 is connected to the MR head 32, as shown in the FIGS. 4, 7 and 8. The first group of wires 25A extending from the first fixing position 38 to the MR head 32 and the second group of wires 25B extending from the second fixing position 39 to the MR head 32 are symmetrically arranged on both the sides of the center line 29 of the support arm 17.

The symmetrical arrangement of the first group of wires 25A and the second group of wires 25B also equalizes the biasing force of the first group of wires 25A applied to the load beam 22 with the biasing force of the second group of wires 25B applied to the load beam 22.

A distance from the third fixing position 37 to the first fixing position 38 is shorter than a total length of the wires 5 which extend from the third fixing position 37 to the center position on the center line 29 and extend from the center position to the first fixing position 38, and a distance from the third fixing position 37 to the second fixing position 39 is shorter than a total distance of the wires 55 which extend from the third fixing position 37 to the center position and extend from the center position to the second fixing position 39, so that a force preventing a free bending motion of the supporting arm 17 is minimized.

In this manner, the stiffness of the first group of wires 25A becomes equal to the stiffness of the second group of wires 25B, so that a desired static attitude of the head/slider assembly 21 is realized.

Figure 5:
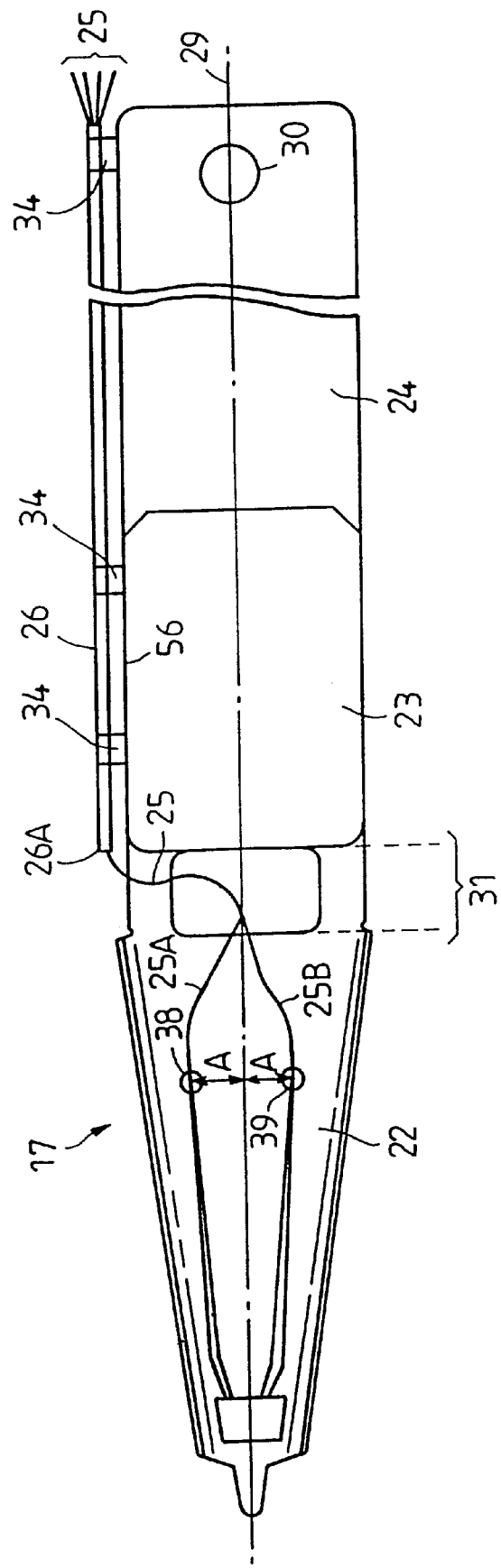
FIG. 5 shows the second embodiment of the head support arm of the present invention.

FIG. 5 shows a second embodiment of the present invention in which the four wires 25 extending from the front end 26A of the tube 26 are divided into the first group 25A and the second group 25B without being fixed at the third fixing position 37 shown in the FIG. 4. The wiring scheme of the second embodiment can bend the support arm 17 more freely than the first embodiment.

FIGS. 6 through 10 show steps included in the method for fabricating the head support arm 17, in accordance with the present invention.

Figure 6:
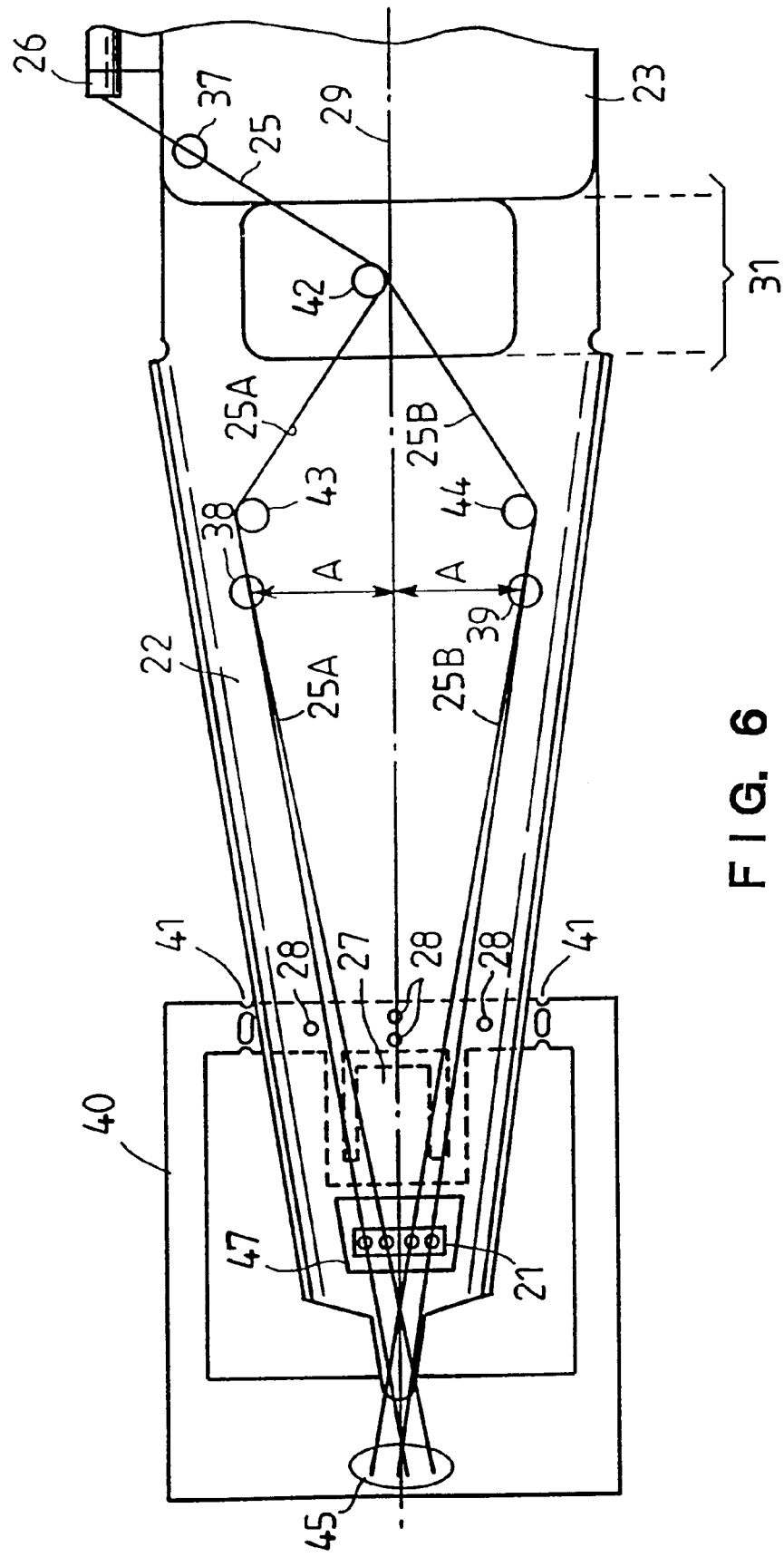
FIG. 6 shows a step of the method of the present invention.

Referring to FIG. 6 and FIG. 7 which shows a oblique drawing of a portion of the front portion of the support arm 17, a frame 40 containing the flexure 27, shown by dotted line, is attached to the load beam 22 at coupling points 28. The frame 40 is later separated from the flexure 27 at portions 41.

Three jigs 42, 43 and 44 are positioned on the load beam 22, as shown in the FIG. 6. The jigs 42, 43 and 44 are used to guide the four wires 25. The four wires 25 are passed through an lower side of the jig 42, and the four wires 25 are divided into the first group 25A and the second group 25B within the bending portion 31. The first group of wires 25A is passed through an upper side of the jig 43 and connected to the frame 40 at a connecting area 45. The second group of wires 25B is passed through an lower side of the jig 44 and connected to the frame 40 at the connecting area 45. The term "the upper side of the jig" in the FIG. 6 means the side near to the tube 26, and the term "lower side" means the side opposite to the upper side.

Next, the four wires 25 are attached to the load beam 22 at the third fixing position 37, the first group of wires 25A is fixed to the load beam 22 at the first fixing position 38, and the second group of wires 25B is fixed to the load beam 22 at the second fixing position 39. The two wires of the first group of wires 25A are connected to the two terminals of the MR head 32, respectively, which is positioned below an aperture 47, and the two wires of the second group of wires 25B are connected to the two terminals of the MR head 32, respectively.

Next, the frame 40 is separated from the flexure 27 at the portions 41, and the unnecessary four wires 25 are cut at the terminals of the MR head 32. The head/slider assembly 21 is rotated by 90 degrees, as shown in the FIG. 8, and an upper surface of the head/slider assembly 21 is connected to a lower surface of a portion 46 of the flexure 27 by the adhesive material.

As the head/slider assembly 21 is rotated, the four wires 25 passing through the aperture 47 may be irregularly bent, as shown in the FIG. 8. Each of the irregularly bent four wires 25 may apply different biasing force to the head/slider assembly 21, so that the desired static attitude of the head/slider assembly 21 may not be realized.

Referring to FIG. 9, a step for shaping the irregularly bent wires 25 to an uniformly bent form by using a shaping element 48 is shown. FIGS. 10(A), (B) and (C) are a bottom view, a rear end view and a side view of the shaping element 48, respectively. As shown in FIG. 10(B) and (C), the shaping element 48 has a flat upper surface 51 and a flat rear wall 50. The length of the front wall 49 is shorter than the length of the rear wall 50. The shaping element 48 has a curved bottom surface 52B, and two ramped surfaces 52A and 52C. As shown in FIG. 10(A), the shape of the curved surface 52B is a rectangle, and the shape of the ramped surface 52A and 52C is a triangle.

As shown in FIG. 9, the flat bottom surface 52B of the shaping element 48 is positioned to a position above the load beam 22 separated by a distance which is about twice of a diameter of the wire 25, and the center line of the shaping element 48 is aligned to the center line 29 of the support arm 17. As the shaping element 48 is moved in a direction of an arrow 53, the bottom surface 52A pushes the right side two wires 25 in a direction of an arrow 54, and also pushed the right side two wires 25 toward the surface of the load beam 22, and the bottom surface 52C pushes the left side two wires 25 in a direction of an arrow 55, and also pushes the left side two wires 25 toward the surface of the load beam 22, whereby the four wires 25 are so shaped that the right side two wires 25 and the left side two wires 25 are symmetrically bent on the both sides of the center line 29 of the support arm 17, and the shape of each of the four wires 25 shown in FIG. 8 becomes an uniform shape. In this manner, the irregularly bent four wires 25 shown in FIG. 8 are shaped to the uniform shape for applying substantially the equal biasing force to the head/slider assembly 21, so that the desired static attitude of the head/slider assembly 21 is realized.

The present invention solves the problem that was difficult for the prior head support arm supporting the MR head to provide. It was difficult to realize static attitude of the head/slider and to precisely control the flying height of head/slider assembly. The head support arm in accordance with the present invention realizes the ideal static attitude of both the 50% type head/slider assembly and 30% type head/slider assembly.

While the preferred embodiments of the present invention have been illustrated in detail, it should be apparent that modifications and adaptations to those embodiments may occur to one skilled in the art without departing from the scope of the present invention as set forth in the following claims.

We claim:

1. A head support arm of a disk drive device comprising;
   a front portion supporting a head/slider assembly,
   a rear portion for connection to a support member in said disk drive device,
   a bending portion between said front portion and said rear portion, having a plurality of electrically conductive wires covered by a tube, and
   a first fixing position and a second fixing position symmetrically located on both sides of a center line of said head support arm at positions between said bending portion and said front portion, characterized in that said tube is attached to said head support arm between said bending portion and said rear portion, said plurality of electrically conductive wires extending from a front end of said tube on the side of said front portion of said head support arm and extending over said bending portion and are divided into a first group and a second group, said first group of wires is fixed at said first fixing position, said second group of wires is fixed at said second fixing position, said first group of wires extending from said first fixing position is connected to said head, said second group of wires extending from said second fixing position is connected to said head, said first group of wires extending from said first fixing position to said head and said second group of wires extending from said second fixing position to said head are symmetrically arranged on both sides of said center line.

2. A head support arm of a disk drive device according to claim 1, wherein said tube is attached to one of side edges of said head support arm.

3. A head support arm of a disk drive device according to claim 2, wherein a third fixing position is located on said head support arm between said bending portion and said rear portion, and said plurality of electrically conductive wires extending from said front end of said tube are fixed at said third fixing position.

4. A head support arm of a disk drive device according to claim 3, wherein said bending portion is defined by an aperture formed in said head support arm between said front portion and said rear portion, and said plurality of electrically conductive wires extending from said third fixing point extend to a center position within said aperture, said position is located on said center line, and said plural electrically conductive wires are divided into said first group and said second group at said center position.

5. A head support arm of a disk drive device according to claim 4, wherein a distance from said third fixing position to said first fixing position is shorter than a total length of said wires which extend from said third fixing position to said center position and extend from said center position to said first fixing position, and a distance from said third fixing position to said second fixing position is shorter than a total distance of said wires which extend from said third fixing position to said center position and extend from said center position to said second fixing position.

6. A disk drive device comprising;
   a recording disk,
   a drive motor for rotating said recording disk,
   a head support arm supporting a head/slider assembly, and
   a device for moving said head support arm to move said head/slider assembly in a radial direction of said recording disk,
   said head support arm containing;
   a front portion supporting said head/slider assembly,
   a rear portion connected to the device for moving said support arm,
   a bending portion between said front portion and said rear portion, having a plurality of electrically conductive wires covered by a tube, and
   a first fixing position and a second fixing position symmetrically located on both sides of a center line of said head support arm at positions between said bending portion and said front portion, characterized in that said tube is attached to said head support arm between said bending portion and said rear portion, said plurality of electrically conductive wires extending from a front end of said tube on the side of said front portion of said head support arm and extending over said bending portion and are divided into a first group and a second group, said first group of wires is fixed at said first fixing position, said second group of wires is fixed at said second fixing position, said first group of wires extending from said first fixing position is connected to said head, said second group of wires extending from said second fixing position is connected to said head, said first group of wires extending from said first fixing position to said head and said second group of wires extending from said second fixing position to said head are symmetrically arranged on both sides of said center line.

7. A disk drive device according to claim 6, wherein said tube is attached to one of side edges of said head support arm.

8. A disk drive device according to claim 7, wherein a third fixing position is located on said head support arm between said bending portion and said rear portion, and said plurality of electrically conductive wires extending from said front end of said tube are fixed at said third fixing position.

9. A disk drive device according to claim 8, wherein said bending portion is defined by an aperture formed in said head support arm between said front portion and said rear portion, and said plurality of electrically conductive wires extending from said third fixing point extend to a center position within said aperture, said position is located on said center line, and said plural electrically conductive wires are divided into said first group and said second group at said center position.

10. A disk drive device according to claim 9, wherein a distance from said third fixing position to said first fixing position is shorter than a total length of said wires which extend from said third fixing position to said center position and extend from said center position to said first fixing position, and a distance from said third fixing position to said second fixing position is shorter than a total distance of said wires which extend from said third fixing position to said center position and extend from said center position to said second fixing position.

11. A method for fabricating a head support arm of a disk drive device which contains a front portion supporting a head/slider assembly, a rear portion pivotally mounted on a frame of said disk drive device, and a bending portion between said front portion and said rear portion, with a first fixing position and a second fixing position symmetrically located on both sides of a center line of said head support arm at positions between said bending portion and said front portion, comprising steps of;

attaching a tube within which a plurality of electrically conductive wires are contained to one of side edges of said head support arm at positions between said bending portion and said rear portion, dividing said plurality of electrically conductive wires extending from a front end of said tube on the side of said front end into a first group and a second group at a position above said bending portion, connecting said first group of wires to said first fixing position and said second group of wires to said second fixing position, and connecting said first group of wires extending from said first fixing position to said head, and said second group of wires extending from said second fixing position to said head, with said first group of wires extending between said first fixing position and said head and said second group of wires extending between said second fixing position and said head being symmetrically arranged on both sides of said center line.

12. A method for fabricating a head support arm of a disk drive device according to claim 11, comprising a step for moving said first group of wires extending from said first fixing position to said head in a direction from said center line to one of said side edges and moving said second group of wires extending from said second fixing position to said head in a direction from said center line to the other of said side edges.

* * * * *